United States Patent [19]

Appelt

[11] 4,382,278

[45] May 3, 1983

[54] HIERARCHIAL MEMORY SYSTEM WITH MICROCOMMAND MEMORY AND POINTER REGISTER MAPPING VIRTUAL CPU REGISTERS IN WORKSPACE CACHE #4 AND MAIN MEMORY CACHE

[75] Inventor: Daren R. Appelt, Austin, Tex.

[73] Assignee: Texas Instruments Incorporated, Dallas, Tex.

[21] Appl. No.: 156,723

[22] Filed: Jun. 5, 1980

[51] Int. Cl.³ .......................... G06F 9/22; G06F 13/00
[52] U.S. Cl. ................................. 364/200; 365/189; 365/230
[58] Field of Search ... 364/200 MS File, 900 MS File; 365/189, 230

[56] References Cited

U.S. PATENT DOCUMENTS

| | | | |
|---|---|---|---|
| 3,723,976 | 3/1973 | Alvarez et al. | 364/200 |
| 3,820,078 | 6/1974 | Curley et al. | 364/200 |
| 3,840,862 | 10/1974 | Ready | 364/200 |
| 3,967,247 | 6/1976 | Andersen et al. | 364/200 |
| 3,986,171 | 10/1976 | Spoelder | 364/200 |
| 4,067,058 | 1/1978 | Brandstaetter et al. | 364/200 |
| 4,079,447 | 3/1978 | Garziera | 364/200 |
| 4,126,893 | 11/1978 | Cronshaw et al. | 364/200 |
| 4,219,883 | 8/1980 | Kobayashi et al. | 365/189 |
| 4,290,104 | 9/1981 | Hotley et al. | 364/200 |
| 4,298,929 | 11/1981 | Capozzi et al. | 364/200 |
| 4,313,158 | 1/1982 | Porter et al. | 364/200 |
| 4,317,168 | 2/1982 | Messina et al. | 364/200 |
| 4,322,815 | 3/1982 | Broughton | 364/900 |

*Primary Examiner*—James D. Thomas
*Assistant Examiner*—Archie E. Williams, Jr.
*Attorney, Agent, or Firm*—Melvin Sharp; N. Rhys Merrett; Thomas G. Devine

[57] ABSTRACT

A digital computer system having a plurality of working registers in at least one workspace in its main memory and having a workspace pointer register for indicating the location of the workspace also has a workspace cache memory made up of registers corresponding to the working registers in the workspace of the main memory. Computer operations are implemented using the contents of the workspace cache registers whose contents are transmitted to the corresponding working registers in the workspace of the main memory in the event of a context switch. Advantageously, the architecture of this workspace system achieves high speed register-to-register operations and high speed context switching.

6 Claims, 7 Drawing Figures

HIERARCHIAL MEMORY SYSTEM WITH MICROCOMMAND MEMORY AND POINTER REGISTER MAPPING VIRTUAL CPU REGISTERS IN WORKSPACE CACHE #4 AND MAIN MEMORY CACHE

BACKGROUND OF THE INVENTION

1. Field of the Invention

This invention pertains to digital computer systems and in particular to digital computer systems organized to provide a plurality of working registers in a workspace in the main memory.

2. Description of the Prior Art

In prior art digital computers, a general register-file architecture is implemented. The register file in such a computer is directly controlled and used by the assembly language programmer. The registers are used, in actuality, as a cache memory, local to the processor. However, the user must manually make the decisions as to which values in his program are kept in the register file so as to optimize speed. He must also decide the contents of which registers must be saved and restored during context switching. Both of these decisions are difficult for a human operator and errors result in slow or false operation of the user's program.

To reduce these problems, computers with a memory workspace architecture were developed. The advantages of this type computer is that the context switch overhead is low and also there is simple internal architecture implementation. The result is an architecture that is both fast and simple to implement, which results in a very cost effective computer. However, certain operations such as register-to-register operations are slower with a workspace architecture than with a register-file architecture since workspace registers are actually in main memory and not in the central processing unit (CPU). U.S. Pat. No. 4,067,058 describes workspace architecture.

This invention is of a memory caching technique for workspace registers. Advantage is taken of the fact that the workspace consists of sequential words in memory and that the control state of the CPU is known. The result is a computer with the advantages of a workspace architecture but without the disadvantages of slow register operations.

BRIEF SUMMARY OF THE INVENTION

A digital computer system having a central processor unit, a microcommand memory and a main memory, is logically arranged to provide a plurality of working registers in at least one workspace in the main memory and has a workspace pointer register for indicating the address of the first working register in the workspace. The system further has a workspace cache memory which is made up of registers within the CPU, corresponding to the working registers in the workspace in main memory. As the program demands, contents of a workspace register is read from main memory into the corresponding register in the workspace cache memory. Once read into the cache memory, the main memory is not referenced when the content of that particular working register is required, but instead references are to the cache memory. The transfer of the workspace from the main memory is made only on demand. If context switch occurs, the contents of the cache memory registers must be transferred back into the corresponding working registers in the main memory. Since the cache registers are filled only on demand, the contents of only those workspace cache memory registers currently being used by the program need to be transferred back to the main memory workspace. An "empty flag" bit is associated with each of the registers in the workspace cache memory, to indicate that the associated register is empty. Logic associated with the invention then requires transfers in or out of the workspace cache memory registers, depending upon the operation.

A principle object of this invention is to provide a computer system with a workspace architecture that has the advantage of high speed context switching and also has high speed register-to-register operations.

This and other objects are made evident in the detailed description that follows.

DETAILED DESCRIPTION

Figure 1:
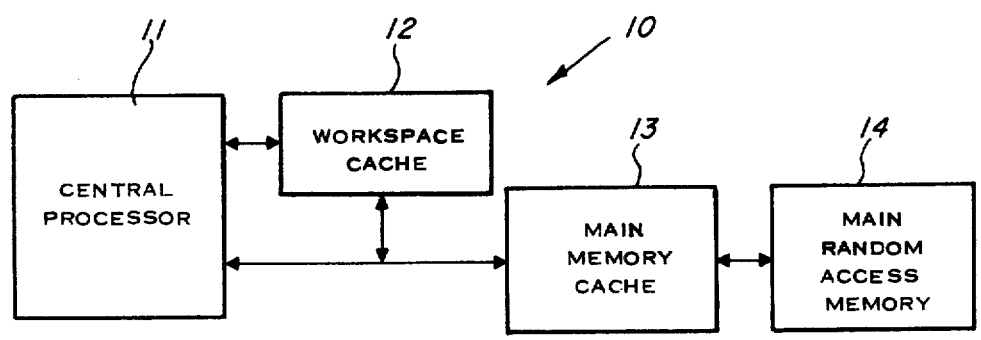
FIG. 1 is a block diagram of the computer system.

Referring first to FIG. 1, computer system 10 is shown comprised of central processor 11 bilaterally connected to workspace cache 12, main memory cache 13 and main random access memory 14. Main memory cache 13, in this preferred embodiment, is simply a high speed memory for buffering information from main memory 14. Workspace cache 12 receives information from either the main memory cache 13 or main memory 14.

Figure 2:
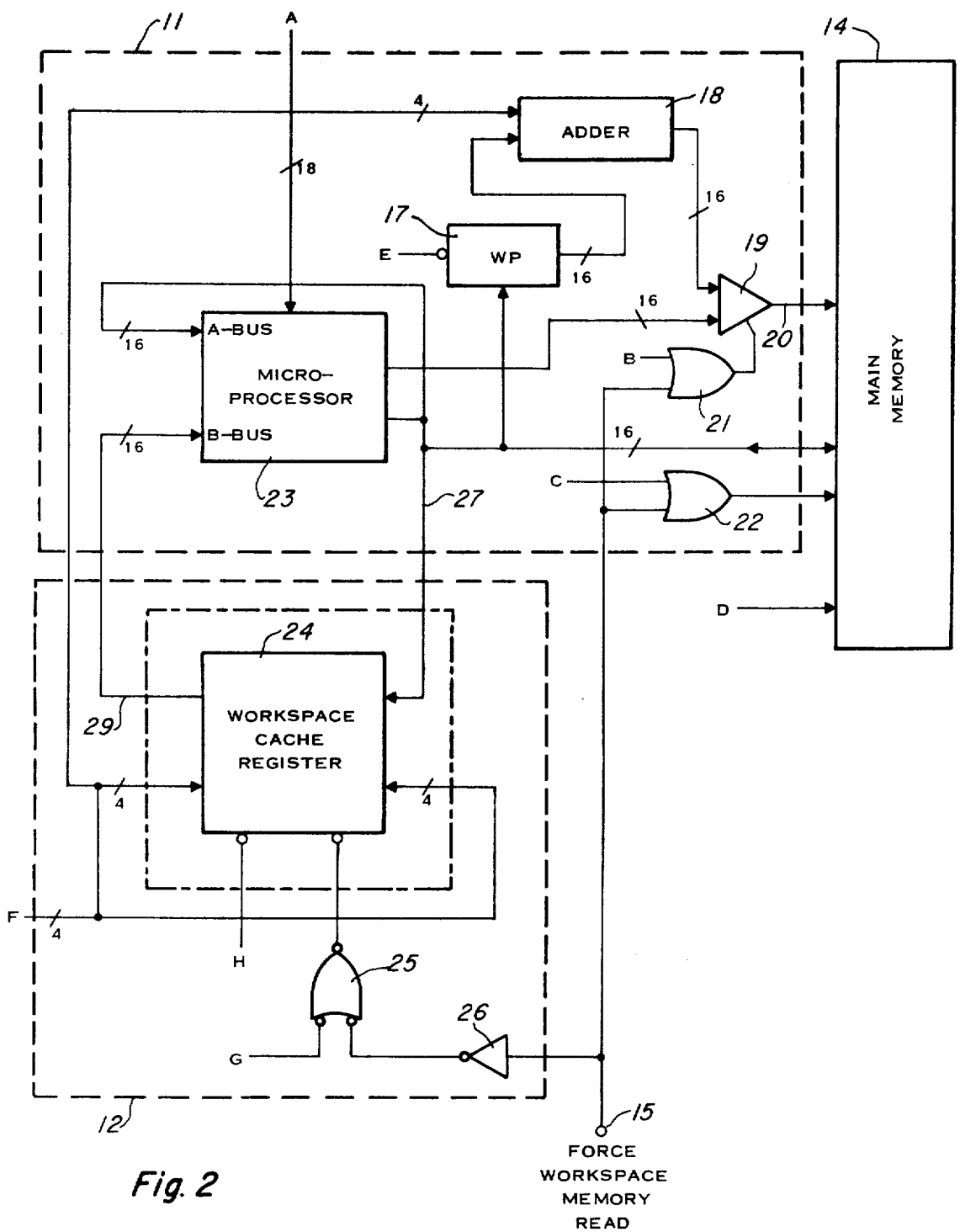
FIG. 2 is a schematic diagram of a part of the computer system.

FIG. 2 shows central processor 11 being made of up microprocessor 23 having an address output to data selector 19, and a data bus output to workspace pointer register 17, workspace cache register 24, A bus input of microprocessor 23 and to the main memory 14. In this preferred embodiment, microprocessor 23 is made up of four Texas Instruments Incorporated type SN74S481 4-bit expandable parallel binary micro/macro programmable processor, described in detail in the Texas Instruments Incorporated "Bipolar Microcomputer Components Data Book" dated January 1977, beginning at page 1. Field A, an 18 bit word from the microcommand memory ROM 41 of FIG. 4, is applied to microprocessor 23. Signal E, a single bit to cause the contents of the data bus to be loaded into the workspace pointer register 17 is shown applied to that register. The output of the workspace pointer register 17 is a sixteen bit word applied to adder 18 which has a four bit signal F from the microcommand memory ROM 41 applied as another input. In this preferred embodiment, adder 18 is made up of four Texas Instruments Incorporated 74LS83 4-bit binary full adders with fast carry described in detail in the Texas Instruments Incorporated "The TTL Data Book" copyright 1976 beginning at page 7-53. The output of adder 18 is applied as another input to selector 19 which is made up four Texas Instruments type 74LS157 selectors described beginning at page 7-181 of the TTL Data Book. The address output of selector 19 is applied to the main memory 14. The selector 19 is enabled by OR gate 21 which has one signal B from the microcommand word from microcommand memory ROM 41 and has another signal "Force Workspace Memory Read" from FIG. 3 which also serves as one input to OR gate 22. The other input to OR gate 22 is applied by signal C, a single bit from the microcommand word to cause a main memory read. Also applied as an enabling input to the main memory 14 is single bit D from the microcommand word, to cause the main memory to write.

The workspace cache 12 is shown comprised of workspace cache register 24 which has signal H, a single bit from the microcommand word, to cause a single register of the workspace cache register 24 to be read onto the B bus 29 of the microprocessor 23. AND gate 25 provides another input to workspace cache register 24 having signal G, a single bit from the microcommand word and the "force workspace memory read signal" inverted through inverter 26 as another input to cause the workspace cache register to be loaded from the data bus 27 from microprocessor 23. Signal F also provides an input to the workspace cache register 24. Workspace cache register 24, in this preferred embodiment, is made up of sixteen Texas Instruments type SN74LS670 4-by-4 register files, described in detail beginning at page 7-526 of the TTL Data Book.

Figure 3:
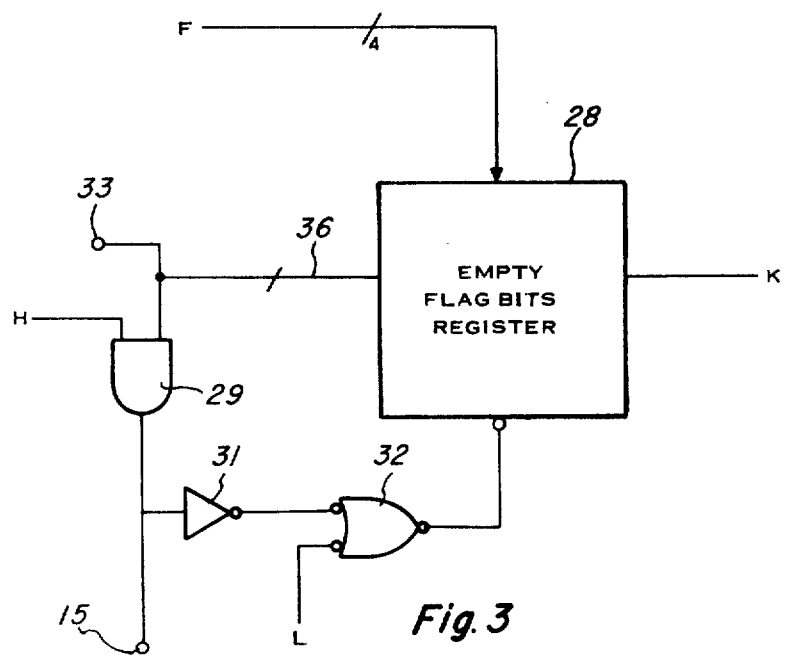
FIG. 3 is a schematic diagram of the empty flag bits circuitry.
Figure 4:
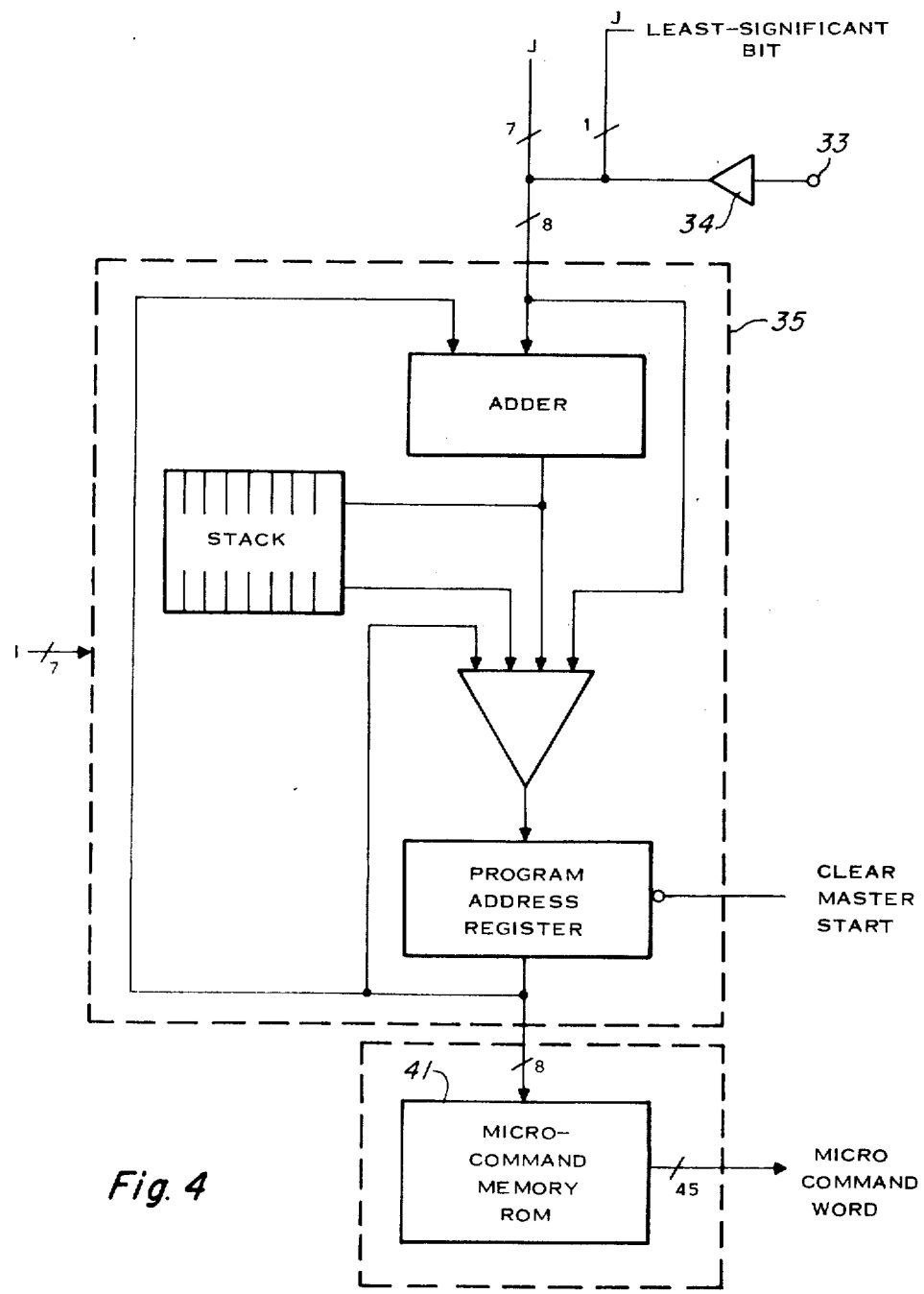
FIG. 4 is a schematic diagram of the controller and microcommand memory ROM.

FIG. 3 illustrates the empty flag bits register 28 having an addressing capability from signal F, a four-bit field signal from the microcommand word for addressing the individual empty flag bits. Another input is provided by signal K, a single bit from the microcommand word to indicate whether a zero or a one should be written into the flag bit. Empty flag bits register 28, in this preferred embodiment, is a Texas Instruments type 74S189 random-access memory described fulling beginning at page 4-15 of the Texas Instruments "Bipolar Microcomputer Components Data Book" dated January 1977. An output on line 36, indicating an empty flag bit, is provided as an input to AND gate 29 whose other input is provided from bit 8 of the microcommand word which enables the workspace cache read. The output on line 36 is also applied to terminal 33 which in turn is connected to the input of amplifier 34 of FIG. 4. The output from AND gate 29 as applied to terminal 15 as a "force workspace memory read" signal which in turn is applied to the input of gates 21 and 22, respectively of FIG. 2. The output of AND gate 29 is also inverted through inverter 31 and applied as one input to AND gate 32 whose other input is the L bit of the microcommand word, the output of AND gate 32 providing an enable signal "empty flag right" to register 28.

FIG. 4 illustrates expandable control element 35 which is a Texas Instruments type SN74S482, described in detail beginning at page 41 of the "bipolar microcomputer components Data Book". It has seven bits applied from the I field for its control. The output from amplifier 34 is connected to the least significant bit from the J field of the micro code word and then connected to the remaining seven bits of the J field where specifying microprogram jump addresses.

Connected to the output of controller 35 is the microcommand memory ROM 41 whose output on line 45 is the microcommand word. The format of the microcommand word is shown below:

| A | B | C | D | E | F | G | H | I | J | K | L |
|---|---|---|---|---|---|---|---|---|---|---|---|

A: 18-bit field to control microprocessor 23.
B: 1 bit to select memory workspace addressing.
C: 1 bit to cause memory to read((address) to data bus).
D: 1 bit to cause memory to write (data bus to (address)).
E: 1 bit to cause data bus to be loaded into the workspace pointer register 17.
F: 4-bit field to address selected workspace register either in cache or memory and to address cache register empty flag.
G: 1 bit to cause selected workspace cache register to be loaded from the memory data bus 27.
H: 1 bit to cause selected workspace cache register to be read onto the B bus 29.
I: 7-bit field to control controller 35.
J: 8-bit field to specify microprogram jump addresses.
K: 1 bit to indicate value to be written to specified workspace cache register empty flag.
L: 1 bit to indicate that a value is to be written to workspace cache register empty flag.

MODE OF OPERATION

Figure 5:
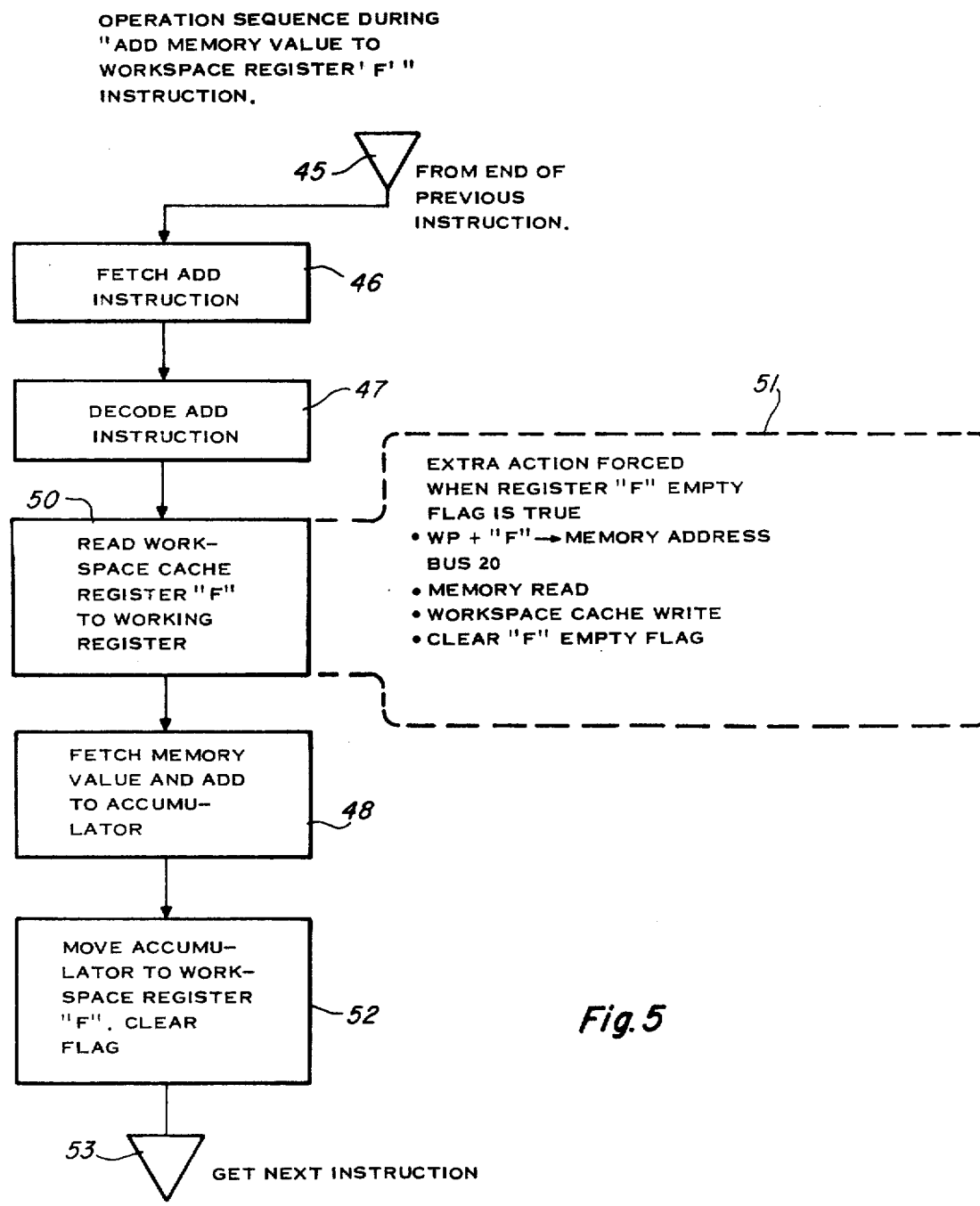
FIG. 5 is a flow chart illustrating the operation of "Add Memory Value to Workspace Register".

Referring to FIG. 5, an operation sequence during the "add memory value to workspace register 'F'" instruction is shown. After the completion of a previous instruction, this sequence is started by fetching an add instruction at block 46. At block 47 the add instruction is decoded and at block 50 the workspace cache register "F" is read to the working register. The microcommand for the block 50 operation is:

| A | B | C | D | E | F | G | H | I | J | K | L |
|---|---|---|---|---|---|---|---|---|---|---|---|
| 000010001011111101 | C | 0 | 0 | 0 | 0110 | 0 | 1 | 1010001 | 00000000 | 0 | 0 |

If register "F" is empty, then the workspace pointer 17 plus register number "F" is forced onto the memory address bus 20. Referring to FIG. 2, gate 21 has an output from either control line B which normally causes workspace addressing or from the "force workspace memory read" signal applied at terminal 15. The workspace addressing will then be forced and the workspace address will appear on the memory address bus 20. The "force workspace memory read signal" is generated from AND gate 29 of FIG. 3 whose output is high whenever there is a workspace cache read instruction and the workspace cache register empty flag is high.

The next operation in block 51 is a memory read. Referring to FIG. 2, OR gate 22 has one input activated by the normal read control bit C and another by the "force workspace memory read" signal from gate 29.

The third function in control block 51 is workspace cache write with the "force workspace memory read" signal being inverted through inverter 26 of FIG. 2 and applied as one input to AND gate 25. The control signal G is the normal, programmed manner to cause a workspace cache right.

The fourth function shown in block 51 is a clear F empty flag. Referring to FIG. 3, the output of gate 29 is inverted through inverter 31 and applied to the input of AND gate 32. Gate 32 with the enabled bit L applies an output to the empty flag bit register 28 as a write control.

After this operation, at block 48 a fetch memory value and add to accumulator is accomplished. At block 52 the contents of the accumulator are moved to the workspace register "F" and the appropriate flag bit is cleared. Then the computer moves on to the next instruction at block 53.

When the computer is operating normally, using the workspace cache register 24 for its operands, the steady use of the main memory is avoided. However, when an interrupt signal is received by the computer system, then the contents of the workspace cache register must be placed in corresponding registers within the main memory. It should be pointed out that only those workspace cache registers that required action have been loaded and therefore only those registers need be restored to the actual workspace in main memory 14.

Figure 6A:
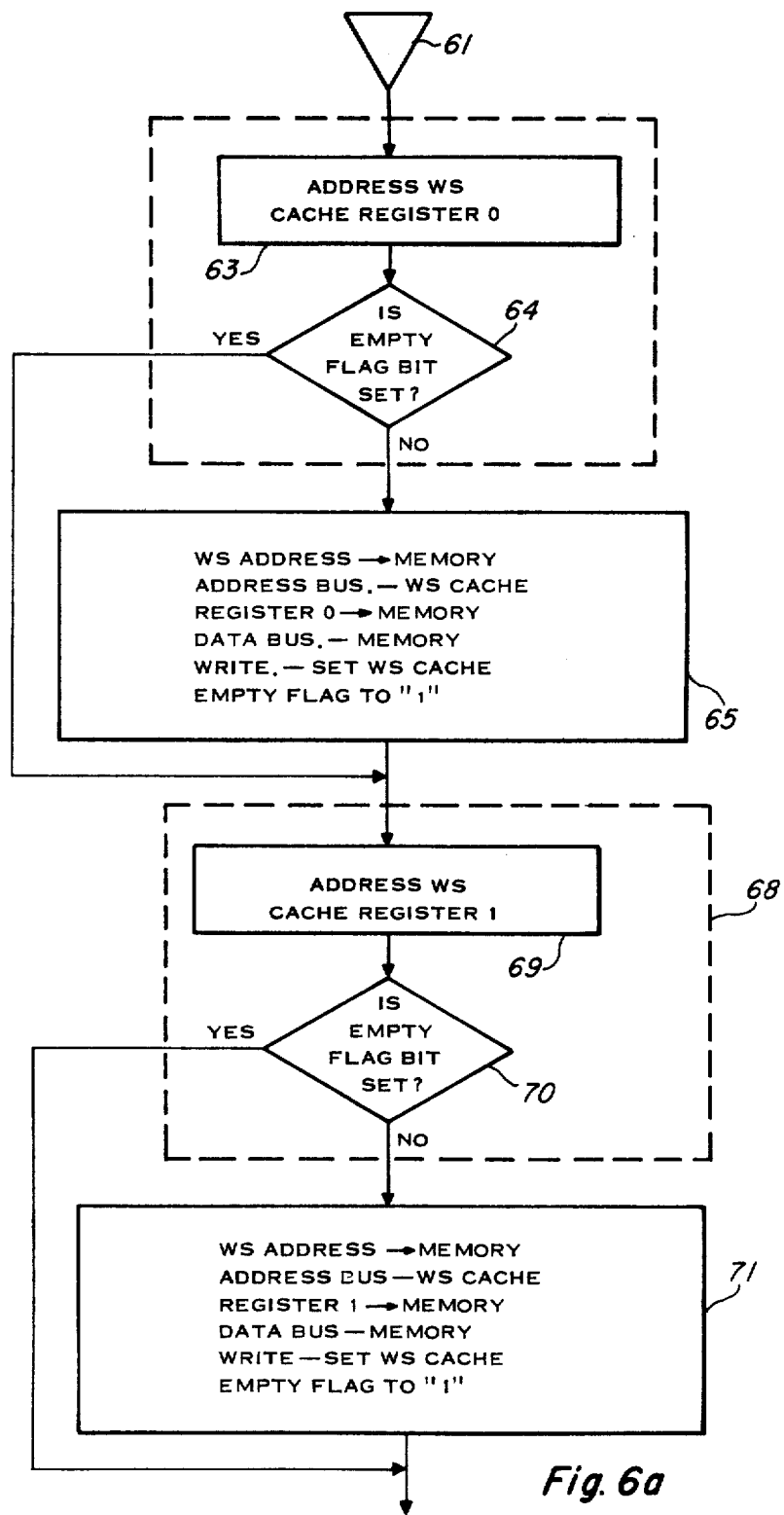
FIGS. 6a and 6b form a flow chart illustrating "Dump Workspace Cache".
Figure 6B:
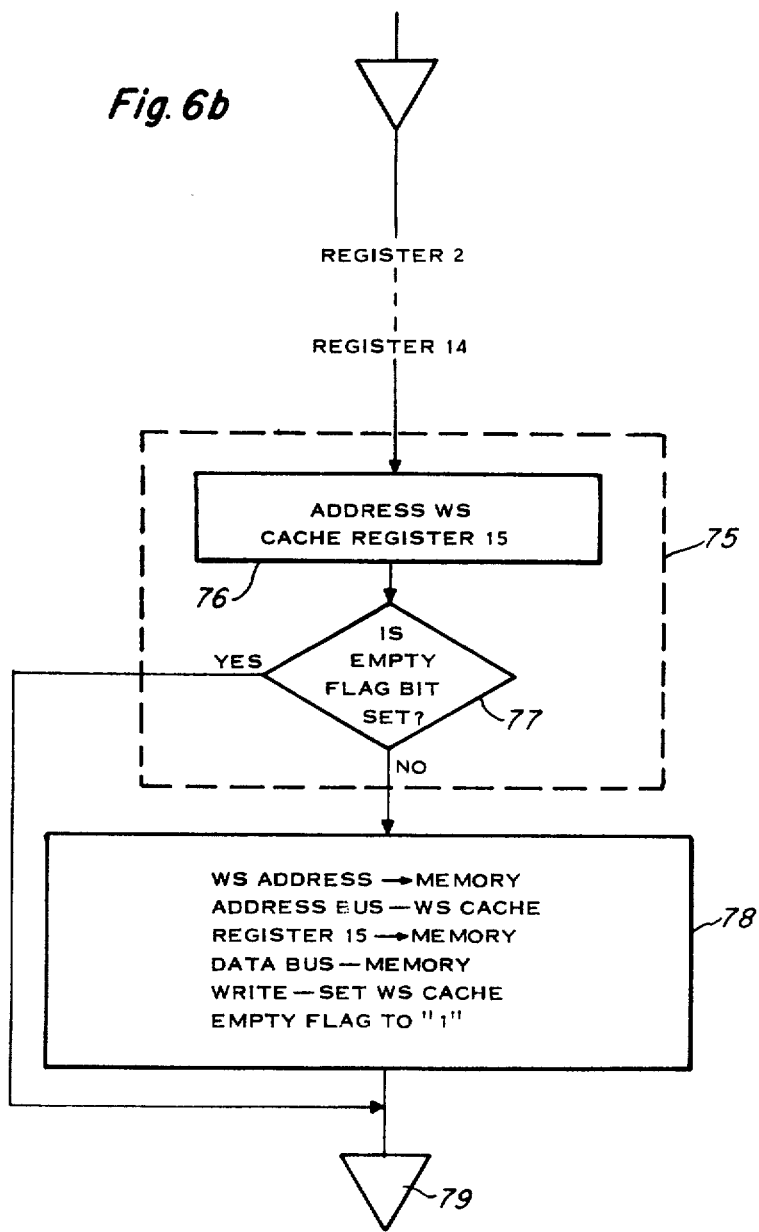

Referring to FIGS. 6a and 6b this operation is described in flow chart form beginning with an input from block 61 to the block 63 for addressing the first workspace cache register, number 0. Then at decision block 64 the question "is empty flag bit set" is asked. If the answer is yes, the procedure goes on to block 69 where the second register, namely register number 1 is addressed. Then at block 70, the question "is empty flat bit set" again asked.

Going back to decision block number 64, if the flag bit has not been set, signifying that the cache register "F" is full, then the program proceeds to block 65 where the workspace address from workspace pointer register 17 is applied to main memory address bus 20. Next the workspace cache register 0 is applied to the memory data bus. Then a memory write is done. Finally, the appropriate workspace cache empty flag is set to "1".

If the answer is "no" to the question at block 70, exactly the same procedure is followed as described above with respect to register 0.

This operation requires the microcommand words:

1.

| A | B | C | D | E | F | G | H | I | J | K | L |
|---|---|---|---|---|---|---|---|---|---|---|---|
| 1111111111111111 | 0 | 0 | 0 | 0 | 0000 | 0 | 0 | 0010001 | 00000001 | 0 | 0 |

2.

| A | B | C | D | E | F | G | H | I | J | K | L |
|---|---|---|---|---|---|---|---|---|---|---|---|
| 1000100010111111100 | 1 | 0 | 1 | 0 | 0000 | 0 | 1 | 1010001 | 00000000 | 1 | 1 |

All sixteen registers of the workspace cache are treated in the same manner as described above, and in sequence, in this preferred embodiment. That is, as shown in FIG. 6b, at block 76, workspace cache register 15 is addressed. At decision block 77 the question is asked "is empty flag bit set?". If the answer is yes, the procedure is ended at block 79, if the answer is no then the same procedure as indicated for register 0 is followed.

In summary, this structure described provides for operations on internal registers, when called for, from a memory workspace. As the words from the memory workspace are called into the workspace cache register, they are retained for use by the computer. When a context switch occurs, the contents of those workspace cache registers which are filled, are sent back to the main memory.

One of ordinary skill in the art may alter the logical structure without departing from the scope of the invention. For example, the registers in the workspace cache could be accessed simultaneously. Also, a separate bus for writing to the workspace cache could be used to relieve the main memory referencing to enable overlapping. Also, the scanning of the workspace cache empty flag bits during the operation of dumping the workspace cache as set out in FIGS. 6a and 6b could be eliminated. The scan could be done in parallel by employing priority encoder logic to indicate directly which registers are not empty. Of course the number of registers in the workspace cache can be varied to fit a given computer architecture.

What is claimed is:

1. A digital computer system having central processor unit and a microcommand memory for controlling the central processor unit, comprising:
   (a) a main memory having a plurality of central processor unit working registers in at least one workspace;
   (b) a workspace pointer register for indicating the location of the workspace;
   (c) workspace cache memory means, corresponding to the plurality of working registers in the workspace, connected to provide digital words to the central processor unit and to bilaterally exchange digital words with the plurality of working registers;
   (d) indicia means indicating the presence or absence of digital words in the workspace cache memory means; and
   (e) command means, responsive to the microcommand words from the microcommand memory for transferring the contents of the workspace cache memory means to the workspace in the main memory at the address indicated by the workspace pointer register and for transferring the contents of selected ones of the plurality of working registers to the workspace cache memory.

2. The computer system of claim 1 wherein the workspace cache memory means comprises a plurality of registers.

3. The computer system of claim 2 wherein the indicia means comprises at least one register, with each stage of the register corresponding to one of the plurality of registers of the workspace cache means.

4. The computer system of claim 1 wherein the command means comprises:
   (i) means for changing the indicia means to indicate the presence or absence of digital words in the workspace cache memory means after a transfer of selected sections of the contents of the workspace cache means to the workspace in the main memory or vice-versa;
   (ii) means for monitoring the indicia means; and
   (iii) means, responsive to the monitoring means for forcing accessing of at least a selected one of the plurality of registers in the workspace of the main memory.

5. The system of claim 3 wherein the indicia means register comprises a random access memory with each stage separately addressable.

6. The system of claim 4 wherein the indicia means register comprises a random access memory with each stage separately addressable.

* * * * *